United States Patent
Nam et al.

(10) Patent No.: US 7,755,264 B2
(45) Date of Patent: Jul. 13, 2010

(54) COMPOSITION FOR FORMATTING AN ELECTRON EMISSION SOURCE FOR USE IN AN ELECTRON EMISSION DEVICE AND AN ELECTRON EMISSION SOURCE FABRICATED USING THE SAME

(75) Inventors: Joong-Woo Nam, Suwon-si (KR);
Mee-Ae Ryu, Suwon-si (KR);
Jong-Hwan Park, Suwon-si (KR);
Won-Seok Kim, Gunsan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 658 days.

(21) Appl. No.: 11/067,864

(22) Filed: Feb. 26, 2005

(65) Prior Publication Data
US 2005/0189860 A1 Sep. 1, 2005

(30) Foreign Application Priority Data
Feb. 26, 2004 (KR) ............ 10-2004-0013143

(51) Int. Cl.
*H01J 9/02* (2006.01)
*H01J 1/00* (2006.01)

(52) U.S. Cl. ............ 313/310; 313/311; 313/495

(58) Field of Classification Search ......... 313/309–311, 313/495–497
See application file for complete search history.

(56) References Cited

U.S. PATENT DOCUMENTS

| | | | |
|---|---|---|---|
| 5,194,780 | A | 3/1993 | Meyer |
| 6,858,981 | B2 | 2/2005 | Cho et al. |
| 2002/0197928 | A1* | 12/2002 | Ahn et al. ............ 445/59 |
| 2003/0132393 | A1* | 7/2003 | Dimitrijevic et al. ..... 250/423 F |
| 2004/0017141 | A1* | 1/2004 | Cheng et al. ............ 313/311 |
| 2004/0150312 | A1* | 8/2004 | McElrath et al. ............ 313/310 |
| 2005/0002851 | A1* | 1/2005 | McElrath et al. ......... 423/447.3 |

FOREIGN PATENT DOCUMENTS

| | | |
|---|---|---|
| CN | 1323051 A | 11/2001 |
| CN | 1413906 A | 4/2003 |
| CN | 1440044 A | 9/2003 |
| CN | 1467772 A | 1/2004 |
| JP | 2000-123712 | 4/2000 |
| JP | 2002-037614 A | 2/2002 |
| JP | 2003-303539 A | 10/2003 |

OTHER PUBLICATIONS

English Abstract of CN 1323051A.
Patent Abstracts of Japan and English computer translation of JP 2000-123712, dated Apr. 28, 2000, listed above.
Bandow, S., et al., *Effect of the Growth Temperature on the Diameter Distribution and Chirality of Single-Wall Carbon Nanotubes*, Physical Review Letters, vol. 80, No. 17, Apr. 27, 1998, pp. 3779-3782.

* cited by examiner

*Primary Examiner*—Bumsuk Won
(74) *Attorney, Agent, or Firm*—Christie, Parker & Hale, LLP

(57) ABSTRACT

The present invention relates to a composition for formatting an electron emission source of an electron emission device, and an electron emission source comprising the same. The composition comprises a paste comprising multi-walled carbon nanotubes exhibiting an RBM (Radial Breathing Mode) peak. The paste further comprises an inorganic powder, a binder resin, and an organic solvent. The electron emission source made from the composition of the present invention improves the lifetime and electron emission characteristics of the electron emission device by using multi-walled carbon nanotubes having excellent lifetime and electron emission characteristics.

11 Claims, 6 Drawing Sheets

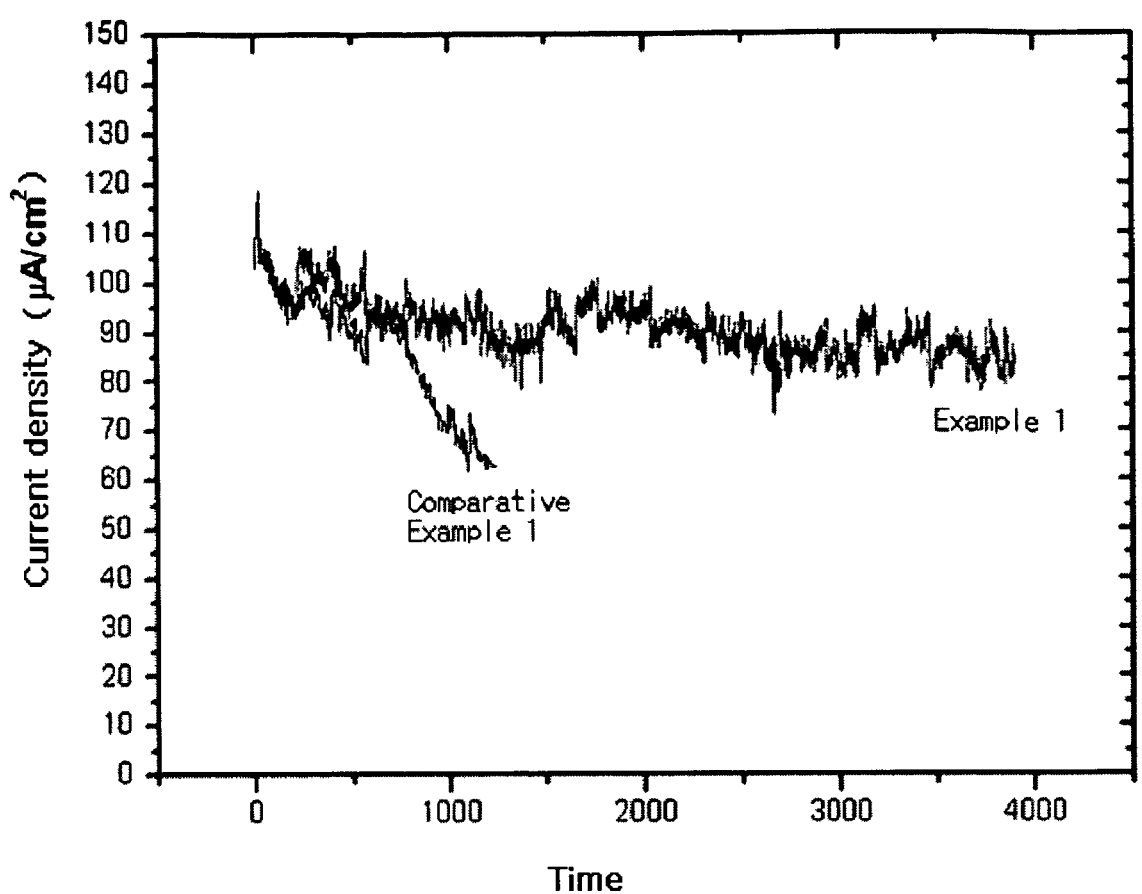

COMPOSITION FOR FORMATTING AN ELECTRON EMISSION SOURCE FOR USE IN AN ELECTRON EMISSION DEVICE AND AN ELECTRON EMISSION SOURCE FABRICATED USING THE SAME

CROSS REFERENCE TO RELATED APPLICATION

This application claims priority to and the benefit of Korean Patent Application No. 10-2004-0013143 filed on Feb. 26, 2004 in the Korean Intellectual Property Office, the entire disclosure of which is incorporated herein by reference.

FIELD OF THE INVENTION

The present invention relates to a composition for formatting an electron emission source for use in an electron emission device and an electron emission source fabricated using the composition. More particularly, the invention is directed to a composition for formatting an electron emission source that is capable of improving the lifetime and electron emission characteristics of the electron emitter. The composition uses multi-walled nanotubes ("MWNT") having excellent lifetime and emission capabilities.

BACKGROUND OF THE INVENTION

Previously, an electron emission devices were made using a spindt-type electron emission source. Such an electron emission source comprises layers laminated with a material such as Mo, Si, etc. and processed to a sharp tip. However, this spindt-type electron emission source has an ultra-fine structure and its manufacturing method is very complicated, requiring a high degree of precision. Consequently, manufacturing large field emission display devices according to this method is extremely difficult. The electron emission device is preferably a field emitter array (FEA) type electron emission device.

To solve this problem, a carbon-based material having a low work function has recently been proposed for use as the electron emission source. In particular, carbon nanotubes (CNT) perform well as electron emission sources because they have high aspect ratios and small tip radii of curvature of about 100 Å. Therefore, electrons are readily emitted by application of a low external voltage, e.g. a voltage as low as about 1 to about 3 V/μm.

Use of carbon nanotubes having low work functions as the electron emission source enables low voltage operation and easy manufacturing of the electron emission source. These advantages enable the manufacture of large field emission displays.

Generally, such an electron emission source is fabricated by first forming the carbon nanotubes into a paste along with a solvent, a resin, etc. The paste is then screen printed between two substrates and fired.

The carbon nanotubes may be synthesized according to several different methods. For example, physical methods of synthesis may include electric discharge or laser deposition. Chemical methods of synthesis may include screen printing or chemical vapor deposition.

The carbon nanotubes are primarily synthesized using the electric discharge method. FIG. 1 is a schematic depicting an apparatus performing the electric discharge method. According to this method, a direct current source is applied between a cathode 10 and an anode 20. Both the anode and cathode each comprise a graphite or metal rod. A discharge occurs between the anode and cathode generating numerous electrons which then collide with the anode rod 20. The collision of electrons with the anode rod causes carbon clusters to become disjoined from the anode rod. These carbon clusters are then condensed onto the surface of the cathode rod, which is maintained at a low temperature, thereby creating carbon nanotubes.

According to the laser deposition synthesis method, a graphite rod is placed in a high temperature reaction furnace and is irradiated by a laser beam. This irradiation evaporates the graphite, and the evaporated graphite is then adsorbed on a collector that is maintained at a low temperature.

To fabricate either single-walled or multi-walled carbon nanotubes using physical synthesis methods such as electric discharge and laser deposition, a cavity must be formed in a pure graphite anode rod and filled only with catalytic metals such as Y, Ni, Fe, Co, etc.

According to the screen printing method, a cathode layer is fabricated by screen printing a paste comprising mainly single-walled carbon nanotubes formed by arc discharge. The cathode layer is then used as the CNT for the electron emission device.

According to the chemical vapor deposition (CVD) method, carbon nanotubes are synthesized by applying a carbon source gas such as acetylene to formatted fine catalytic particles.

SUMMARY OF THE INVENTION

In one embodiment of the present invention a paste composition is provided for formatting an electron emission source having excellent lifetime and emission characteristics. The paste composition comprises multi-walled carbon nanotubes among the carbon nanotubes used as cathode materials for the electron emission device.

In another embodiment of the present invention a composition is provided for formatting an electron emission source having excellent lifetime and emission characteristics.

In yet another embodiment of the present invention an electron emission device is provided comprising an electron emission source formatted using the inventive composition.

BRIEF DESCRIPTION OF THE DRAWINGS

The above and other advantages of the present invention will be better understood by reference to the following detailed description when considered in conjunction with the accompanying drawings wherein:

FIG. 7 is a graph of the lifetime characteristics of multi-walled carbon nanotubes contained in a composition prepared according to Example 1, and multi-walled carbon nanotubes contained in a composition prepared according to Comparative Example 1.

DETAILED DESCRIPTION OF THE PREFERRED EMBODIMENTS

The present invention provides a paste composition for formatting an electron emission source for use in an electron emission device. The composition comprises multi-walled carbon nanotubes having a radial breathing mode (RBM) peak in the Raman spectrum. The composition also comprises an inorganic powder, a binder resin and an organic solvent. The present invention also provides an electron emission source prepared by coating and printing the composition, and an electron emission device comprising an electron emission source prepared by coating and printing the composition.

In addition, the present invention provides an electron emission source comprising multi-walled carbon nanotubes having a RBM peak in the Raman spectrum. Preferably, the multi-walled carbon nanotubes are synthesized according to the chemical vapor deposition method and have diameters of 15 nm or less.

Hereinafter, the present invention is described in more detail.

The present invention provides a composition for formatting an electron emission source comprising multi-walled carbon nanotubes having excellent lifetime and emission characteristics.

Two kinds of carbon nanotubes can be used in the cathode material for an electron emission device, i.e. single-walled carbon nanotubes (SWNT) and multi-walled carbon nanotubes (MWNT). Generally, single-walled carbon nanotubes (SWNT) have excellent emission characteristics, and multi-walled carbon nanotubes (MWNT) have excellent lifetime characteristics.

Multi-walled carbon nanotubes may be synthesized using an arc discharge method or a chemical vapor deposition method. The synthesis method determines the purity, degree of crystallization, and diameter of the multi-walled carbon nanotubes (MWNT).

The appearance of a RBM peak in the Raman spectrum distinguishes single-walled nanotubes from multi-walled nanotubes. Because the RBM peak appears chiefly in carbon nanotubes with small diameters, it is generally difficult to observe in MWNTs.

However, the present invention greatly improves the electron emission and lifetime characteristics of an electron emission source of am electron emission device by providing a cathode layer having multi-walled nanotubes which exhibit the RBM peak in the Raman spectrum.

Figure 3:
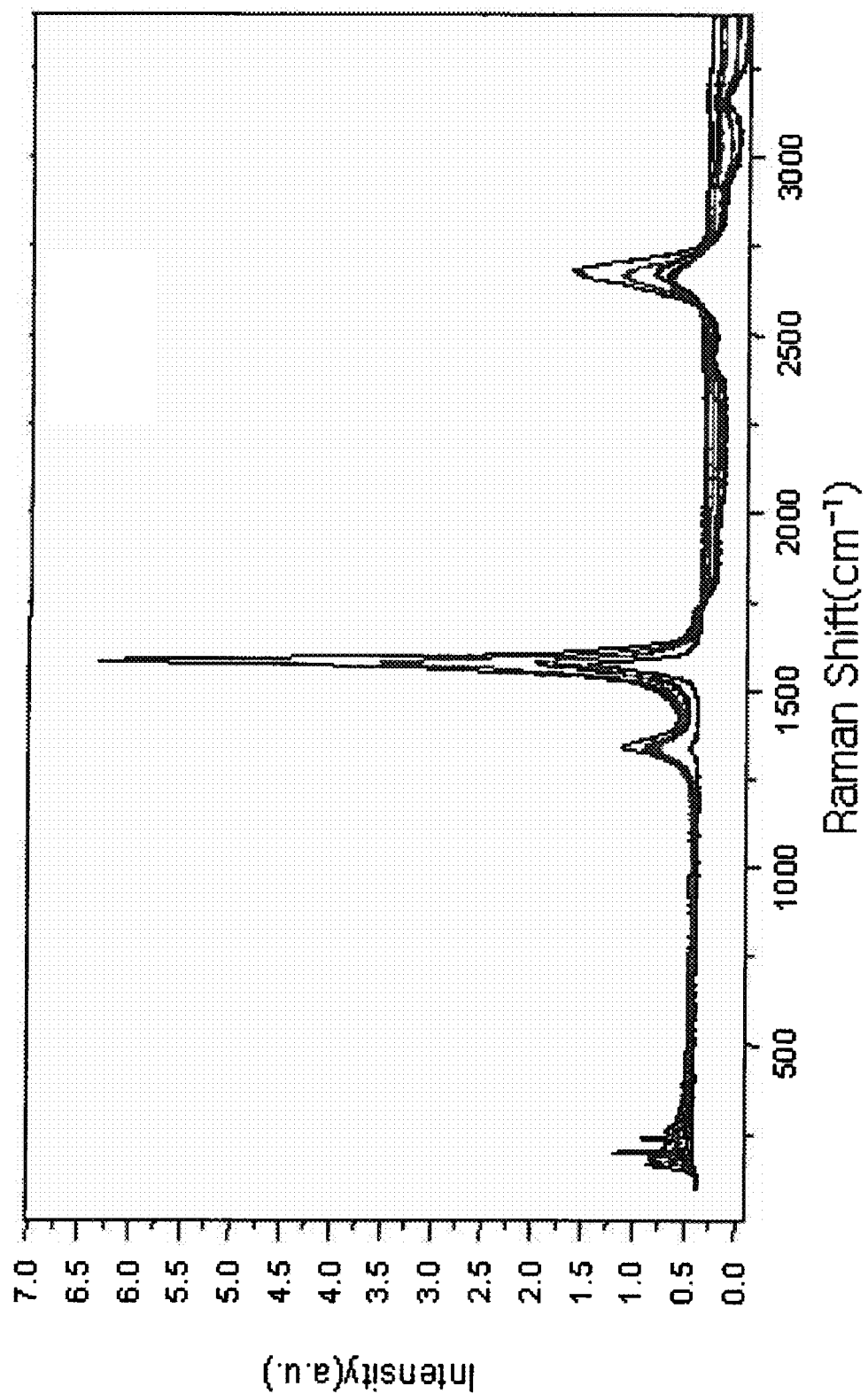
FIG. 3 is a graph of the Raman spectrum of the multi-walled carbon nanotubes used in a composition of the present invention.
Figure 4:
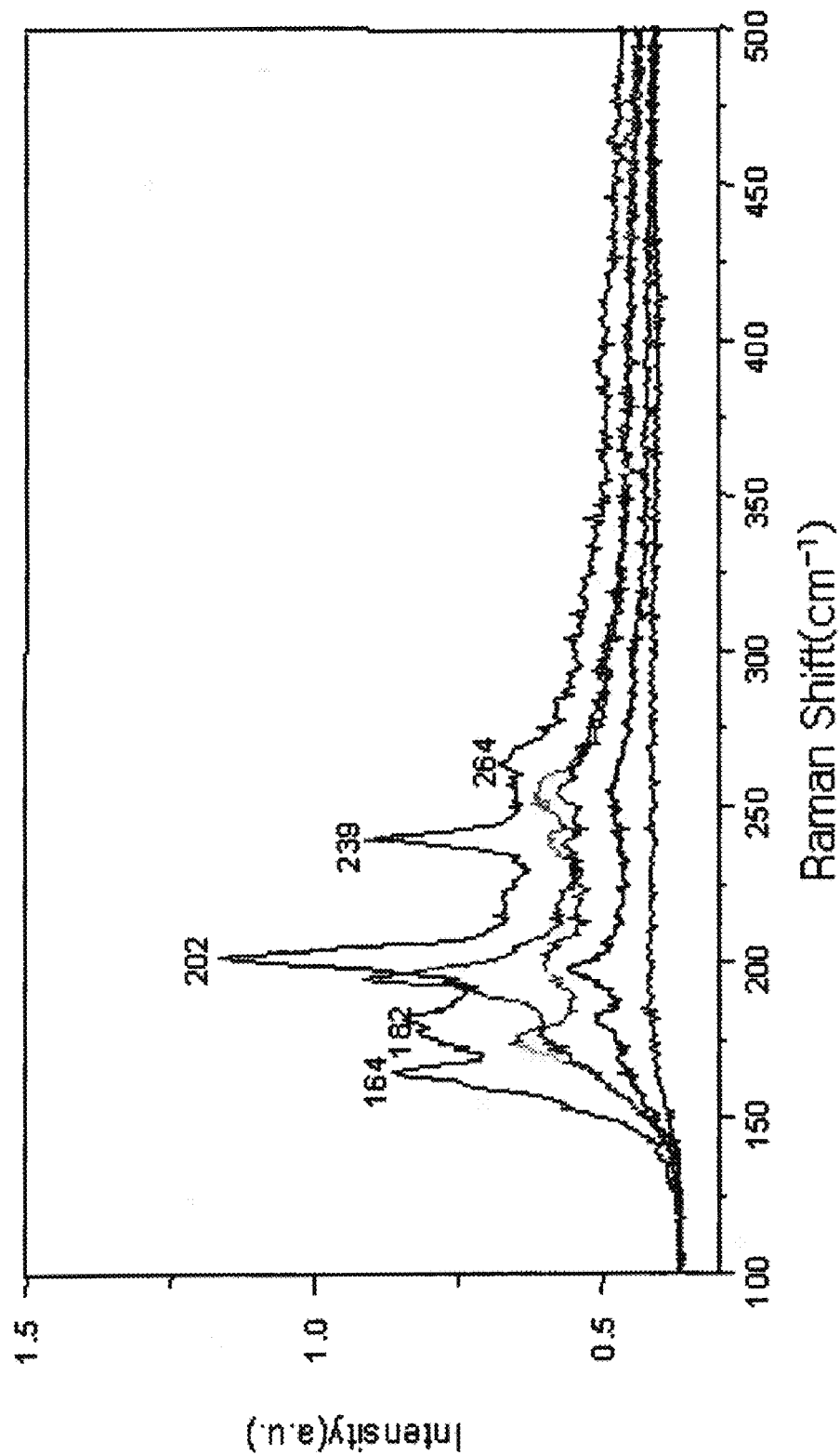
FIG. 4 is an amplified graph of the low frequency spectrum of the Raman spectrum of FIG. 3.

Because the RBM peak appears in the Raman spectrum between 100 and 500 $cm^{-1}$, it is generally believed that multi-walled carbon nanotubes do not exhibit an RBM peak. *Physical Review Letter*, Vol. 80, No. 17, Apr. 17, 1998. However, as shown in FIGS. 3 and 4, the multi-walled carbon nanotubes of the present invention, which have small diameters, do exhibit an RBM peak.

A powder of multi-walled carbon nanotubes exhibiting the RBM peak can be synthesized according to an arc discharge method or a chemical vapor deposition method. The arc discharge method can produce MWNTs 10 nm or less in diameter, but the electron emission characteristics of MWNTs synthesized in this manner are not as good as the electron emission characteristics of MWNTs synthesized according to the chemical vapor deposition method.

Figure 1:
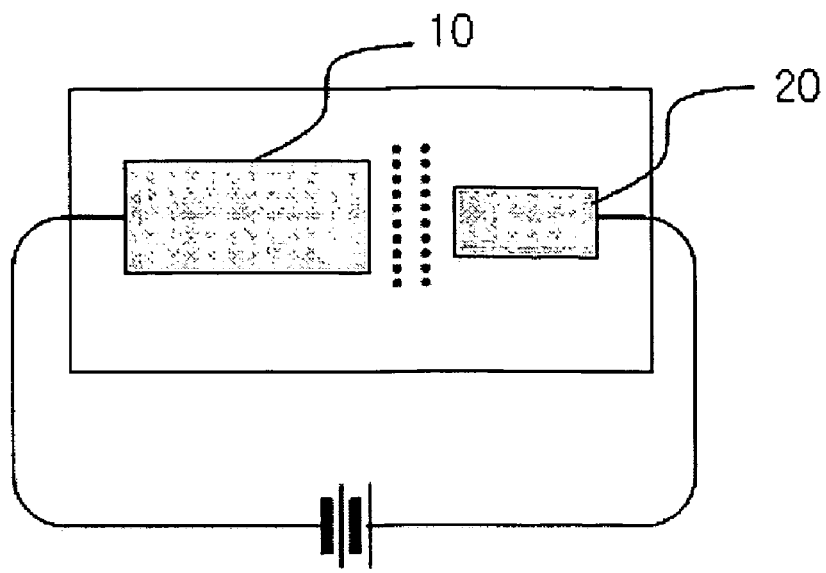
FIG. 1 is a schematic depicting an electric discharge apparatus for fabricating carbon nanotubes.
Figure 2:
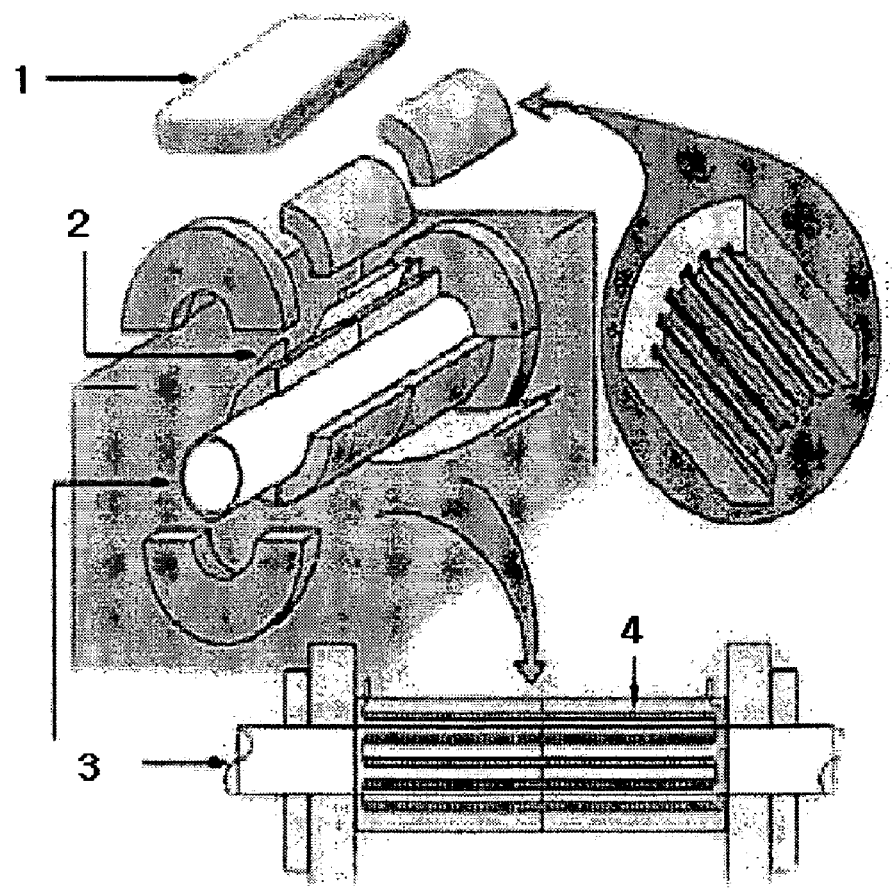
FIG. 2 is a schematic depicting a thermal chemical vapor deposition apparatus for fabricating carbon nanotubes.

The chemical vapor deposition method is capable of fabricating MWNTs exhibiting the RBM peak because the diameters of the carbon nanotubes are controlled by adjusting the pore size of the support, which is filled with a catalytic metal. The chemical vapor deposition method fabricates multi-walled carbon nanotubes by supplying a carbon source gas such as acetylene to a porous support containing fine catalytic particles. The porous support may comprise MgO, $SiO_2$, etc. The gas flow rate is about 500 sccm, and the temperature is maintained between about 600 and about 800° C. This method reduces the diameters of the MWNTs by controlling the pore size of the porous support. As shown in FIG. 2, a thermal chemical vapor deposition apparatus useful for fabricating the MWNTs for use in the present invention comprises an insulating body 1, an Electronic rod 2, a quartz tube 3, and a heating coil 4.

The present invention also provides an electron emission device comprising the above-described electron emission source which comprises multi-walled carbon nanotubes having excellent electron emission characteristics. To fabricate the electron emission device, a cathode electrode is first formed on a board having a deformation temperature lower than 650° C. Any method for pattern formation can be used to format the electrode, including normal photolithography. After cathode formation, a porous support is formed which comprises MgO, $SiO_2$, etc. The diameter of the porous support is 20 nm or less. A catalytic metal such as Ni, Ni—Cr, Fe, Ta, Ti, W, Mo, and Al is then placed within the porous support, and the cathode board is situated inside a chemical vapor deposition chamber where a carbon source gas, such as acetylene, is supplied.

As noted above, the gas flow rate in the quartz tube is 500 sccm and the temperature is maintained at 600 to 800° C. A support is directly grown from the catalytic metal of the cathode and is used as the cathode substrate of the electron emission device.

The present invention also provides a paste composition for formatting the electron emission source. The paste composition comprises a multi-walled carbon nanotube powder having excellent electron emission characteristics.

The paste composition also comprises an inorganic powder, a binder resin, and an organic solvent. The paste composition comprises multi-walled carbon nanotubes in an amount ranging from about 0.1 to about 30 wt %, preferably about 5 to about 20 wt %.

The inorganic powder may comprise glass frit, aluminum oxide, zirconium oxide, etc., and is preferably present in the composition in an amount ranging from about 1 to about 10 wt %, though it is not limited to that amount.

The binder resin may comprise one or more materials selected from the group consisting of inorganic binder resins and organic binder resins. Nonlimiting examples of suitable binder resins include acrylic resins, epoxy-based resins, and cellulose-based resins such as ethyl-cellulose and nitro-cellulose resins. The binder resin may be present in the paste composition in an amount ranging from about 10 to about 80 wt %.

The organic solvent may comprise butyl carbitol (BC), butyl carbitol acetate (BCA), terpineol (TP), etc. Although the amount of solvent in the composition is not specifically limited, the organic solvent is preferably present in the composition in an amount ranging from about 60 to about 80 wt %.

If desired, the composition may further comprise one or more of a conventional photosensitive monomer, a photoinitiator, a photosensitive resin such as a polyester acrylate-based monomer, a non-photosensitive polymer such as cellulose, an acrylate, a vinyl-based monomer, a dispersant, an anti-foamer, and the like.

When used, the photosensitive monomer enhances pattern decomposition. Such a photosensitive monomer may be selected from the group consisting of thermally decomposable acrylate-based monomers, benzophenone-based monomers, acetophenone-based monomers, thioxanthene-based monomers, and mixtures thereof. The photosensitive monomer is preferably selected from the group consisting of epoxy acrylate, polyester acrylate, 2,4-diethylxanthone, 2,2-dimethoxy-2-phenyl acetophenone, and mixtures thereof. The photosensitive monomer may be present in the composition in an amount ranging from about 1 to about 70 wt %. However, when a common photo-initiator is used, it is present in the composition in an amount ranging from about 0.1 to about 10 wt %.

A method for preparing the inventive composition for formatting an electron emission source is described below.

To fabricate the composition according to the present invention, the multi-walled carbon nanotube powder, which exhibits an RBM peak, is mixed with glass frit and an inorganic binder resin. A vehicle is then prepared by mixing the solvent and an organic binder resin. The mixture comprising the multi-walled carbon nanotubes, the glass frit, and the inorganic binder resin is then mixed with the vehicle comprising the solvent and the organic binder resin.

Preferably, the paste composition has a viscosity ranging from about 5000 to about 100,000 cps.

One method for formatting the electron emission source of the present invention comprises first printing a thick layer of the paste composition on a substrate such as a metal, semiconductor, insulator, etc. The paste may be applied to the substrate by spin coating, screen coating, screen printing, roll coating, etc. The coated substrate is then heat treated. The heat treatment process is performed in a vacuum or gas atmosphere. When performed in a gas atmosphere, the gas atmosphere may comprise air, nitrogen gas, or an inert gas.

When a photosensitive monomer is present in the composition of the present invention, printing, exposing, development, and plasticity processes are required. In a preferred method, after printing, a parallel light exposure system exposes the thick paste layer to energy ranging from about 10 to about 20,000 mJ/cm$^2$. The thick paste layer is then developed by spraying it with acetone or an alkali solution.

The plasticity process is performed at a temperature ranging from about 450 to about 550° C. The electron emission source is obtained by treating the surface of the paste layer after completion of the plasticity process.

As described above, the present invention provides an electron emission device comprising an electron emission source. The electron emission device is preferably a cold cathode electron emission device.

The following examples illustrate the present invention in further detail. However, the present invention is not limited by these examples.

EXAMPLE 1

2.4 g of multi-walled carbon nanotube powder having particles with diameters of 7 nm and exhibiting a RBM peak was mixed with 0.6 g of glass frit in a ball mill or a mixer. A vehicle was then fabricated by mixing 40 g of terpineol and 6 g of ethyl-cellulose. Equal amounts of the MWNT mixture and the vehicle were pre-mixed in an impeller or rotating mixer. This mixture was then mixed in a 3-roll-mill. The carbon nanotubes were then fabricated by mesh filtering. The resultant paste composition was then screen printed by a printing machine and heat-treated for 10 minutes at 90° C. The paste layer was then exposed by a parallel light exposure system to energy of about 10 to about 20,000 mJ/cm$^2$, and then developed by spraying an alkali solution on the layer. A plasticity process was then performed at a temperature of 450 to 550° C. The electron emission source was then obtained by treating the surface of the layer.

FIG. 3 shows Raman data of the multi-walled carbon nanotubes described above, measured over a wide frequency range. FIG. 4 is an amplification of the low frequency Raman data shown in FIG. 3.

As shown in FIG. 3, the RBM peak appears in the Raman spectrum at a frequency lower than 500 cm$^{-1}$. The RBM peak shown in FIG. 4 in the low frequency range is generally difficult to observe in multi-walled carbon nanotube powders, but can be observed in multi-walled carbon nanotube powders having particle diameters of about 15 nm or less.

Figure 5A:
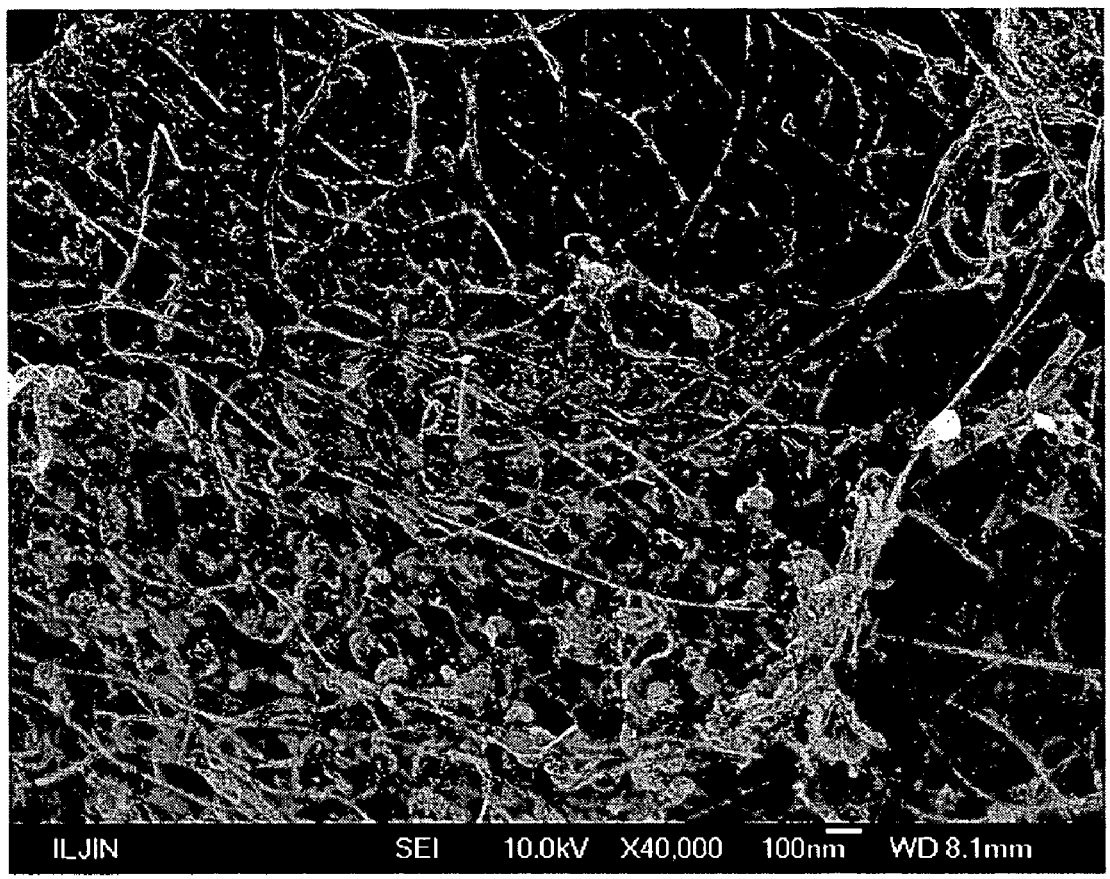
FIGS. 5a and 5b are scanning electron micrographs of multi-walled carbon nanotubes used in one embodiment of the present invention.
Figure 5B:
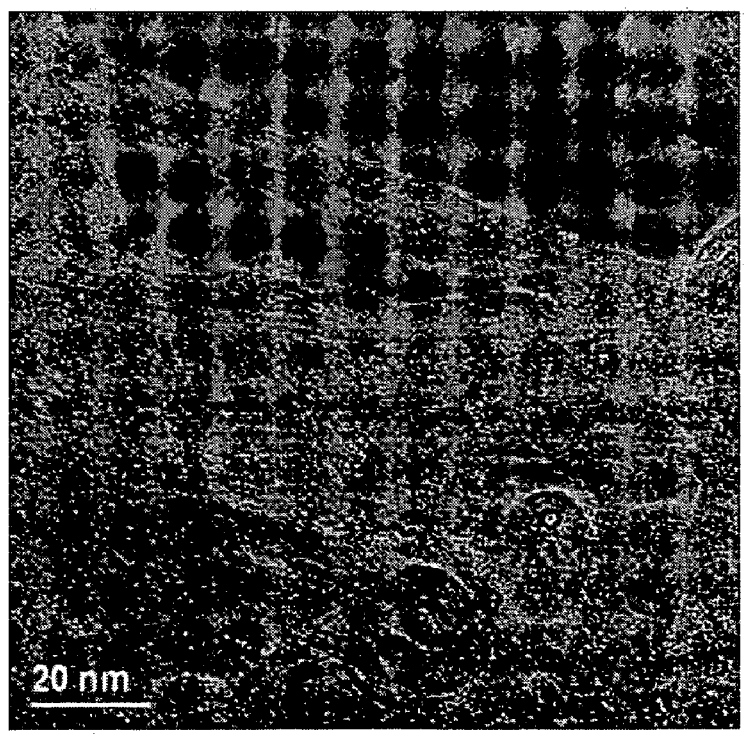

FIGS. 5a and 5b are Scanning Electron Micrographs (SEM) of the multi-walled carbon nanotubes used in the present invention, shown at different magnifications. As shown in FIGS. 5a and 5b, the multi-walled carbon nanotubes of the present invention have small diameters and exhibit excellent crystallization.

COMPARATIVE EXAMPLE 1

An electron emission source was fabricated according to the method described in Example 1, except that single-walled carbon nanotube powder fabricated by the arc discharge method was used instead of the multi-walled carbon nanotube powder exhibiting the RBM peak.

EXPERIMENTAL EXAMPLE 1

The electron emission characteristics of the multi-walled carbon nanotubes of Example 1 and the single walled carbon nanotubes of Comparative Example 1 were measured. The results of these measurements are shown in FIG. 6.

The lifetime characteristics of the multi-walled carbon nanotubes of Example 1 and the single walled carbon nanotubes of Comparative Example 1 were measured. The results of these measurements are shown in FIG. 7.

Figure 6:
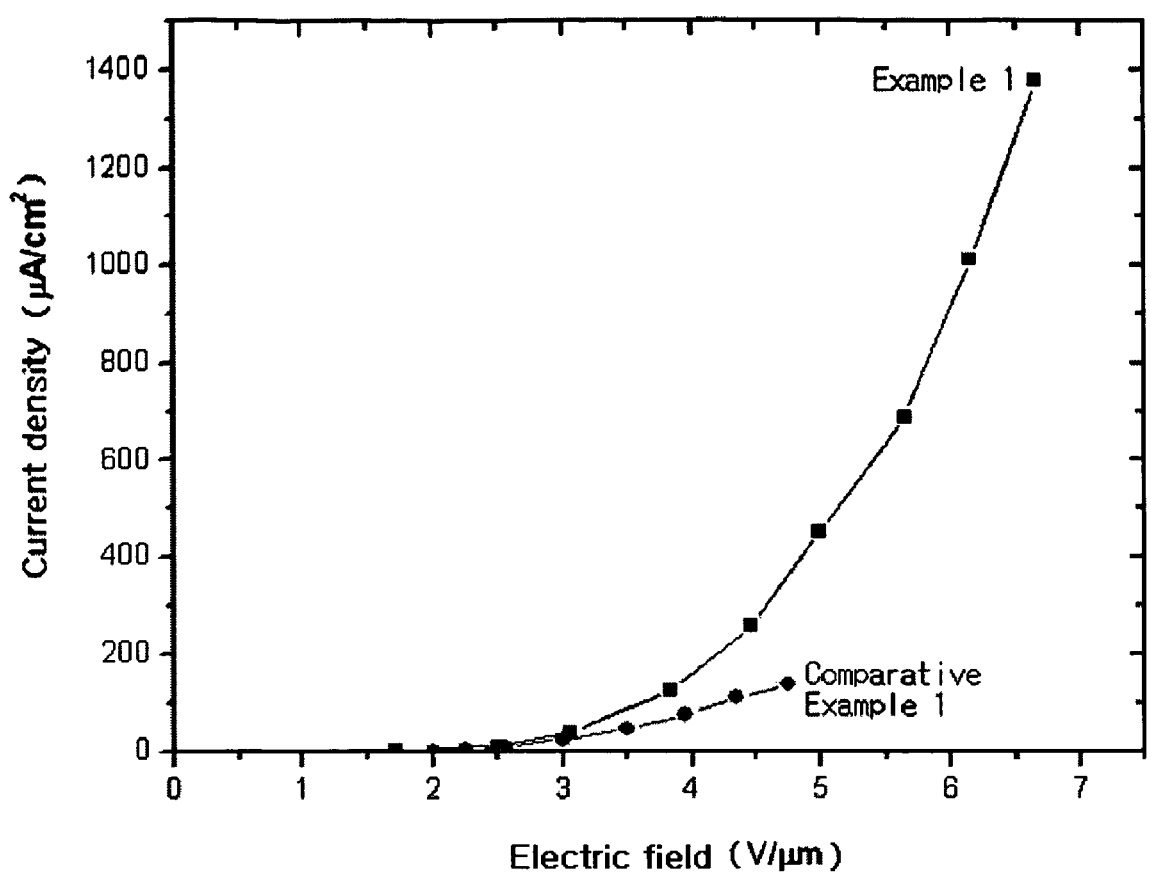
FIG. 6 is a graph of the electron emission characteristics of multi-walled carbon nanotubes contained in a composition prepared according to Example 1, and multi-walled carbon nanotubes contained in a composition prepared according to Comparative Example 1.

As shown in FIGS. 6 and 7, the electron emission and lifetime characteristics of the multi-walled carbon nanotubes of Example 1 were far superior to the single-walled carbon nanotubes of Comparative Example 1.

As described above, the paste composition for formatting the electron emission source comprising the multi-walled carbon nanotube powder exhibiting the RBM peak provides an electron emission source having excellent lifetime and electron emission characteristics.

While the present invention has been described in detail with reference to the preferred embodiments, those skilled in the art will appreciate that various modifications and substitutions can be made without departing from the spirit and scope of the present invention as set forth in the appended claims.

What is claimed is:

1. A composition for formatting an electron emission source of an electron emission device, the composition comprising:
   multi-walled carbon nanotubes exhibiting an RBM (Radial Breathing Mode) peak in the Raman spectrum, wherein the RBM peak appears at about 500 cm$^{-1}$ or less;
   an inorganic powder;
   a binder resin; and
   an organic solvent.

2. The composition for formatting an electron emission source according to claim 1, wherein the multi-walled carbon nanotubes have diameters ranging from about 5 to about 7 nm and are fabricated by a chemical vapor deposition method.

3. The composition for formatting an electron emission source according to claim 1, wherein the multi-walled carbon nanotubes are fabricated by an arc discharge method.

4. The composition for formatting an electron emission source according to claim 1, wherein the multi-walled carbon nanotubes are present in the composition in an amount from about 0.1 to about 30 wt %.

5. The composition for formatting an electron emission source according to claim 1, wherein the inorganic powder comprises at least one material selected from the group consisting of glass frit, aluminum oxide, zirconium oxide, and mixtures thereof.

6. The composition for formatting an electron emission source according to claim 1, wherein the binder resin comprises at least one material selected from the group consisting of inorganic binder resins and organic binder resins.

7. The composition for formatting an electron emission source according to claim 1, wherein the organic solvent comprises at least one solvent selected from the group consisting of butyl carbitol (BC), butyl carbitol acetate (BCA), and terpineol (TP).

8. An electron emission source prepared by print-coating the composition for formatting an electron emission source according to claim 1.

9. An electron emission device comprising an electron emission source formed by print-coating the composition for formatting an electron emission source according to claim 1.

10. An electron emission device, comprising an electron emission source comprising multi-walled carbon nanotubes which exhibit an RBM (Radial Breathing Mode) peak in the Raman spectrum, wherein the RBM peak appears at a wavelength of about 500 $cm^{-1}$ or less.

11. The electron emission device according to claim 10, wherein the multi-walled carbon nanotubes are synthesized by chemical vapor deposition and have diameters of about 5 nm or less.

* * * * *